United States Patent
Jackson

(10) Patent No.: US 8,518,168 B2
(45) Date of Patent: Aug. 27, 2013

(54) INKJET INKS CONTAINING A SILVER SALT HAVING INCREASED OPTICAL DENSITY

(75) Inventor: Christian Jackson, Wilmington, DE (US)

(73) Assignee: E I du Pont de Nemours and Company, Wilmington, DE (US)

( * ) Notice: Subject to any disclaimer, the term of this patent is extended or adjusted under 35 U.S.C. 154(b) by 136 days.

(21) Appl. No.: 13/139,102

(22) PCT Filed: Feb. 1, 2010

(86) PCT No.: PCT/US2010/022742
§ 371 (c)(1),
(2), (4) Date: Jun. 10, 2011

(87) PCT Pub. No.: WO2010/088606
PCT Pub. Date: Aug. 5, 2010

(65) Prior Publication Data
US 2011/0239900 A1    Oct. 6, 2011

Related U.S. Application Data

(60) Provisional application No. 61/148,487, filed on Jan. 30, 2009.

(51) Int. Cl.
*C09D 11/02*    (2006.01)
(52) U.S. Cl.
USPC ........................................................ 106/31.6
(58) Field of Classification Search
USPC ........................................................ 106/31.6
See application file for complete search history.

(56) References Cited

U.S. PATENT DOCUMENTS

| | | | |
|---|---|---|---|
| 4,597,794 A | 7/1986 | Ohta et al. | |
| 5,022,592 A | 6/1991 | Zakheim et al. | |
| 5,026,427 A | 6/1991 | Mitchell et al. | |
| 5,085,698 A | 2/1992 | Ma et al. | |
| 5,310,778 A | 5/1994 | Shor et al. | |
| 5,378,268 A * | 1/1995 | Wolf et al. | 106/1.11 |
| 5,519,085 A | 5/1996 | Ma et al. | |
| 5,554,739 A | 9/1996 | Belmont | |
| 5,630,868 A * | 5/1997 | Belmont et al. | 106/31.75 |
| 5,679,138 A | 10/1997 | Bishop et al. | |
| 5,891,231 A | 4/1999 | Gnerlich et al. | |
| 5,976,232 A | 11/1999 | Gore | |
| 6,143,807 A | 11/2000 | Lin et al. | |
| 6,277,183 B1 | 8/2001 | Johnson et al. | |
| 6,332,919 B2 | 12/2001 | Osumi et al. | |
| 6,852,156 B2 | 2/2005 | Yeh et al. | |
| 6,869,470 B2 * | 3/2005 | Kato | 106/31.6 |
| 6,899,754 B2 | 5/2005 | Yeh et al. | |
| 7,291,292 B2 * | 11/2007 | Ittel | 252/500 |
| 7,351,278 B2 * | 4/2008 | Jackson | 106/31.75 |
| 7,771,523 B2 * | 8/2010 | Jackson | 106/31.6 |
| 7,799,121 B2 * | 9/2010 | Jackson | 106/31.6 |
| 2003/0089277 A1 | 5/2003 | Zakheim et al. | |
| 2005/0244644 A1 * | 11/2005 | Hampden-Smith et al. | 428/408 |
| 2006/0124032 A1 * | 6/2006 | Ichinose et al. | 106/31.6 |
| 2007/0102681 A1 * | 5/2007 | Kodas et al. | 252/500 |
| 2007/0261595 A1 * | 11/2007 | Johnson et al. | 106/31.13 |
| 2008/0071007 A1 | 3/2008 | Spinelli | |
| 2010/0166962 A1 * | 7/2010 | Ohzeki | 427/256 |

FOREIGN PATENT DOCUMENTS
WO        01/94476       6/2001

* cited by examiner

*Primary Examiner* — Helene Klemanski
(74) *Attorney, Agent, or Firm* — Simon L. Xu

(57) ABSTRACT

This invention pertains to aqueous inkjet inks containing a pigment colorant and an effective amount of a water-soluble silver salt having increased optical density when printed.

18 Claims, No Drawings

INKJET INKS CONTAINING A SILVER SALT HAVING INCREASED OPTICAL DENSITY

CROSS REFERENCE TO RELATED APPLICATIONS

This application claims priority under 35 U.S.C. §119 from U.S. Provisional Application Ser. No. 61/148,487, filed Jan. 30, 2009.

BACKGROUND OF THE INVENTION

This invention pertains to an aqueous inkjet ink, in particular to an aqueous inkjet ink comprising an aqueous vehicle, a pigment colorant and a water-soluble silver salt.

Inkjet recording is a printing method wherein droplets of ink are ejected through fine nozzles to form letters or figures on the surface of recording media. Inks used in such recording are subject to rigorous demands including, for example, good dispersion stability, ejection stability, and good fixation to media.

Aqueous dispersions of pigment particles are widely used in ink-jet printing. Because a pigment is typically not soluble in an aqueous vehicle, it is often required to use a dispersing agent, such as a polymeric dispersant or a surfactant, to produce a stable dispersion of the pigment in the aqueous vehicle. More recently, so-called "self-dispersible" or "self-dispersing" pigments (hereafter "SDP(s)") have been developed. As the name would imply, SDPs are dispersible in water without dispersants.

The main advantage of inkjet printers over laser printers includes low cost and simplicity. However, the optical density of ink jet inks on plain paper is lower than the optical density that can be obtained by laser printers. In addition, the time duration for pigment ink to crust in the nozzles of the pen ("decap time"), a parameter required to improve optical density, is too short, especially for those inks with high levels of pigment, consequently resulting in the needs for frequent maintenance leading to lower printer throughput and wasting of ink.

U.S. Pat. No. 6,332,919 discloses black inkjet inks made with SDP and an added monovalent salt to improve optical density. The monovalent salt is an alkali metal, ammonium or organo-ammonium.

U.S. Pat. No. 6,277,183 discloses a black inkjet ink comprising an SDP ink and a metal oxide such as silica or alumina to improve optical density.

U.S. Pat. No. 6,899,754 discloses aqueous inkjet inks containing self-dispersing pigments and multivalent cations to improve optical density.

A need exists for an inkjet ink that has higher optical density on plain paper with improved decap performance. In particular, there is a need for a black ink with higher optical density, improved decap performance and good long-term stability. The present invention satisfies this need by providing compositions having higher optical density, improved decap performance and good long-term stability.

SUMMARY OF THE INVENTION

An embodiment of the invention provides an aqueous inkjet ink comprising an aqueous vehicle, a pigment colorant and a water-soluble silver salt.

Another embodiment provides that the colorant is a self-dispersing pigment having at least one type of a hydrophilic functional group bonded onto the surface of the self-dispersing pigment, and said hydrophilic functional group comprising a carboxyl group.

Another embodiment provides that the silver salt is present at a concentration in the range of from 0.01% to 0.25% by weight.

Yet another embodiment provides that the silver salt is present at a concentration of about 0.01% by weight.

Yet another embodiment provides that the silver salt is present at a concentration of about 0.05% by weight.

Yet another embodiment provides that the silver salt is present at a concentration of about 0.25% by weight.

Another embodiment provides that the silver salt is selected from the group consisting of silver acetate, silver phosphate, silver sulfate, silver nitrate, and combinations thereof.

Yet another embodiment provides that the silver salt is silver acetate.

Yet another embodiment provides that the silver salt is silver phosphate.

Yet another embodiment provides that the silver salt is silver sulfate.

Yet another embodiment provides that the self-dispersing pigment has a degree of functionalization of less than about 3 $\mu mol/m^2$.

These and other features and advantages of the present invention will be more readily understood by those of ordinary skill in the art from a reading of the following Detailed Description. Certain features of the invention which are, for clarity, described above and below as a separate embodiment, may also be provided in combination in a single embodiment. Conversely, various features of the invention that are described in the context of a single embodiment, may also be provided separately or in any subcombination.

DETAILED DESCRIPTION

Unless otherwise stated or defined, all technical and scientific terms used herein have commonly understood meanings by one of ordinary skill in the art to which this invention pertains.

Unless stated otherwise, all percentages, parts, ratios, etc., are by weight.

When an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range.

When the term "about" is used in describing a value or an end-point of a range, the disclosure should be understood to include the specific value or end-point referred to.

As used herein, the term "dispersion" means a two phase system where one phase consists of finely divided particles (often in the colloidal size range) distributed throughout a bulk substance, of the particles being the dispersed or internal phase and the bulk substance being the continuous or external phase.

As used herein, the term "dispersant" means a surface active agent added to a suspending medium to promote uniform and maximum separation of extremely fine solid particles often of colloidal size. For pigments, dispersants are most often polymeric dispersants.

As used herein, the term "SDP" means a "self-dispersible" or "self-dispersing" pigment.

As used herein, the term "OD" means optical density.

As used herein, the term "aqueous vehicle" refers to water or a mixture of water and at least one water-soluble, or partially water-soluble (i.e. methyl ethyl ketone), organic solvent (co-solvent).

As used herein, the term "ionizable groups," means potentially ionic groups.

As used herein, the term "substantially" means being of considerable degree, almost all.

As used herein, the term "MW" means weight average molecular weight.

As used herein, the term "cPs" means centipoise, a viscosity unit.

As used herein, the term "mN·m$^{-1}$" means milliNewtons per meter, a surface tension unit.

As used herein, the term "AN" means acid number.

As used herein, Surfynol® 465 is a surfactant from Air Products (Allentown, Pa., USA).

As used herein, the term "EDTA" means ethylenediaminetetraacetic acid.

As used herein, the term "IDA" means iminodiacetic acid.

As used herein, the term "EDDHA" means ethylenediamine-di(o-hydroxyphenylacetic acid).

As used herein, the term "NTA" means nitrilotriacetic acid.

As used herein, the term "DHEG" means dihydroxyethylglycine.

As used herein, the term "CyDTA" means trans-1,2-cyclohexanediaminetetraacetic acid.

As used herein, the term "DTPA" means diethylenetriamine-N,N,N',N'',N''-pentaacetic acid.

As used herein, the term "GEDTA" means glycoletherdiamine-N,N,N',N'-tetraacetic acid.

Unless otherwise noted, the above chemicals were obtained from Aldrich (Milwaukee, Wis.) or other similar suppliers of laboratory chemicals.

As used herein, an "effective amount" of a water soluble silver salt is an amount required to achieve an improvement of the optical density of the printed ink. In the context of the aqueous inkjet ink described above, the improvement is compared to an aqueous inkjet ink without the presence of the silver salt.

In addition, references in the singular may also include the plural (for example, "a" and "an" may refer to one, or one or more) unless the context specifically states otherwise.

Monovalent Silver Salts

The inks of this invention comprise a water-soluble silver salt. The effective amounts needed in a particular situation can vary, and some adjustment, as provided for herein, will generally be necessary. The choice of silver salts and the effective amount needed to improve optical density or stability is readily determined for each ink as provided for herein.

The silver salts typically exist in a substantially ionized state. The salts should be in a form where they are free and available to interact with ink components, in particular the SDP.

Water-soluble silver salts are those silver salts with a solubility of greater than 0.005 gram of the salt in 1 liter of water at 25° C. Suitable silver salts include, but are not limited to, silver acetate, silver phosphate, silver sulfate and silver nitrate. Silver salts that are only slightly water-soluble, such as silver oxide, silver benzoate, silver carbonate and silver chloride, are not considered to be water-soluble herein.

There is no particular lower limit of silver salts, although minimum levels contemplated by the instant invention are levels greater than trace or incidental amounts. Generally, there is at least about 2 ppm, typically at least about 4 ppm, and more typically at least 10 ppm of silver salts in the ink. Likewise, there is no particular upper limit except as dictated by stability or other ink properties. At some level, though, there is no additional OD gain with increasing silver salts. In general, beneficial effects are achieved with less than 0.25% by weight, and typically with less than 0.10% by weight of silver salts.

Colorant

The raw pigments are insoluble and non-dispersible in the ink vehicle and must be treated in order to form a stable dispersion. "A stable dispersion" means that the pigment is finely divided, uniformly distributed and resistant to particle growth and flocculation.

Treatment of a pigment with a dispersant can stabilize the pigment by forming a dispersion. The term "dispersant" as used herein is generally synonymous with the terms "dispersing agent" and "suspending agent" which are also found in the art.

The dispersant can be any suitable dispersant such as, for example, those disclosed in U.S. Pat. Nos. 4,597,794; 5,085,698; 5,519,085 and 6,143,807, and U.S. Patent Publication. No. US2008/0071007.

A dispersion is prepared by premixing a pigment and a dispersant, followed by dispersing or deflocculating the mixture in a milling step. The premixture includes an aqueous carrier medium (such as water and, optionally, a water-miscible solvent) when the milling step involves a wet milling operation. The milling step may be accomplished in a 2-roll mill, media mill, a horizontal mini mill, a ball mill, an attritor, or by passing an aqueous premix through a plurality of nozzles within a liquid jet interaction chamber at a liquid pressure of at least 5,000 psi to produce a uniform dispersion of the pigment particles in the aqueous carrier medium (microfluidizer). Alternatively, the concentrates may be prepared by dry milling the dispersant and the pigment under pressure. The media for the media mill is chosen from commonly available media, including zirconia, YTZ® (Nikkato Corporation, Osaka, Japan), and nylon. These various dispersion processes are in a general sense well-known in the art, as exemplified by U.S. Pat. Nos. 5,022,592; 5,026,427; 5,310,778; 5,891,231; 5,679,138 and 5,976,232, and U.S. Patent Publication No. 2003/0089277. The pigment dispersion is typically made in a concentrated form (dispersion concentrate), which is subsequently diluted with a suitable liquid containing the desired additives to form the final ink.

It may also be possible to make one or more of the pigments into a so-called self-dispersing pigment. The term self-dispersing pigment ("SDP") refers to pigment particles whose surface has been chemically modified with hydrophilic dispersibility-imparting groups that allow stable dispersion in an aqueous vehicle without a separate dispersant. The hydrophilic dispersibility-imparting surface groups are typically ionizable.

An SDP may be prepared by grafting a functional group or a molecule containing a functional group onto the surface of the pigment, by physical treatment (such as vacuum plasma), or by chemical treatment (for example, oxidation with ozone, hypochlorous acid or the like). A single type or a plurality of types of hydrophilic functional groups may be bonded to one pigment particle. The hydrophilic groups are carboxylate or sulfonate groups which provide the SDP with a negative charge when dispersed in aqueous vehicle. The carboxylate or sulfonate groups are usually associated with monovalent and/or divalent cationic counter-ions. Methods of making SDPs are well known and can be found, for example, in U.S. Pat. No. 5,554,739 and U.S. Pat. No. 6,852,156.

The SDP specified in the present invention comprises carboxylate dispersibility-imparting groups which are directly bonded to the pigment surface.

Small colorant particles should be used for maximum color strength and good jetting. The particle size may generally be in the range of from about 0.005 microns to about 15 microns; more specifically, in the range of from about 0.005 to about 1 micron, more specifically from about 0.005 to about 0.5 micron, and even more specifically, in the range of from about 0.01 to about 0.3 micron.

The SDPs may be black, such as those based on carbon black, or may be colored pigments such as those based on the American Association of Textile Chemists and Colorists Color Index pigments such as Pigment Blue PB15:3 and PB15:4 cyan, Pigment Red PR122 and PR123 magenta, and Pigment Yellow PY128 and PY74 yellow.

The SDPs of the present invention may have a degree of functionalization wherein the density of anionic groups is less than about 3.5 μmoles per square meter of pigment surface (3.5 $\mu mol/m^2$), and more specifically, less than about 3.0 $\mu mol/m^2$. Degrees of functionalization of less than about 1.8 $\mu mol/m^2$, and more specifically, less than about 1.5 $\mu mol/m^2$, are also suitable and may be preferred for certain specific types of SDPs.

The levels of pigment employed in formulated inks are those levels needed to impart the desired optical density to the printed image. Typically, pigment levels are in the range of about 0.01% to about 10% by weight based on the total weight of the ink.

Vehicle

Selection of a suitable aqueous vehicle mixture depends on requirements of the specific application, such as the desired surface tension and viscosity, the selected colorant, drying time of the ink, and the type of substrate onto which the ink will be printed. Representative examples of water-soluble organic solvents which may be utilized in the present invention are those that are disclosed in U.S. Pat. No. 5,085,698.

If a mixture of water and a water-soluble solvent is used, the aqueous vehicle typically will contain about 30% to about 95% of water with the remaining balance (i.e., about 70% to about 5%) being the water-soluble solvent. Compositions of the present invention may contain about 60% to about 95% water, based on the total weight of the aqueous vehicle.

The amount of aqueous vehicle in the ink is typically in the range of about 70% to about 99.8%; specifically about 80% to about 99.8%, based on total weight of the ink.

The aqueous vehicle can be made to be fast penetrating (rapid drying) by including surfactants or penetrating agents such as glycol ether(s) or 1,2-alkanediols. Suitable surfactants include ethoxylated acetylene diols (e.g., Surfynol® series from Air Products), ethoxylated primary (e.g., Neodol® series from Shell) and secondary (e.g., Tergitol® series from Union Carbide) alcohols, sulfosuccinates (e.g., Aerosol® series from Cytec), organosilicones (e.g., Silwet® series from Witco) and fluoro surfactants (e.g., Zonyl® series from DuPont).

The amount of glycol ether(s) or 1,2-alkanediol(s) added must be properly determined, but is typically in a range of from about 1% to about 15% by weight, and more typically about 2% to about 10% by weight, based on the total weight of the ink. Surfactants may be used, typically in an amount of about 0.01% to about 5%, and specifically from about 0.2% to about 2%, based on the total weight of the ink.

Other Ingredients

Other ingredients, additives, may be formulated into the inkjet ink, to the extent that such other ingredients do not interfere with the stability and jetablity of the inkjet ink. This may be readily determined by routine experimentation by one skilled in the art.

Surfactants are commonly added to inks to adjust surface tension and wetting properties. Suitable surfactants include the ones disclosed in the Vehicle section above. Surfactants are typically used in amounts up to about 5% and more typically in amounts up to 2% by weight, based on the total weight of the ink.

Inclusion of sequestering (or chelating) agents such as ethylenediaminetetraacetic acid (EDTA), iminodiacetic acid (IDA), ethylenediamine-di(o-hydroxyphenylacetic acid) (EDDHA), nitrilotriacetic acid (NTA), dihydroxyethylglycine (DHEG), trans-1,2-cyclohexanediaminetetraacetic acid (CyDTA), dethylenetriamine-N,N,N',N",N"-pentaacetic acid (DTPA), and glycoletherdiamine-N,N,N',N'-tetraacetic acid (GEDTA), and salts thereof, may be advantageous, for example, to eliminate deleterious effects of heavy metal impurities.

Polymers may be added to the ink to improve durability or other properties. The polymers can be soluble in the vehicle or in a dispersed form, and can be ionic or nonionic. Soluble polymers include linear homopolymers and copolymers or block polymers. They also can be structured polymers including graft or branched polymers, stars and dendrimers. The dispersed polymers may include, for example, latexes and hydrosols. The polymers may be made by any known process including, but not limited to, free radical, group transfer, ionic, condensation and other types of polymerization. They may be made by a solution, emulsion, or suspension polymerization process. Preferred classes of polymer additives include anionic acrylic, styrene-acrylic and polyurethane polymer.

When a polymer is present, its level is typically between about 0.01% and about 3% by weight, based on the total weight of an ink. The upper limit is dictated by ink viscosity or other physical limitations.

Ink Properties

Jet velocity, separation length of the droplets, drop size and stream stability are greatly affected by the surface tension and the viscosity of the ink. Pigmented ink jet inks typically have a surface tension in the range of about 20 dyne/cm to about 70 dyne/cm at 25° C. Viscosity can be as high as 30 cPs at 25° C., but is typically somewhat lower. The ink has physical properties compatible with a wide range of ejecting conditions, i.e., driving frequency of the piezo element or ejection conditions for a thermal head for either a drop-on-demand device or a continuous device, and the shape and size of the nozzle. The inks should have excellent storage stability for long periods so as not to clog to a significant extent in an ink jet apparatus. Furthermore, the ink should not corrode parts of the ink jet printing device it comes in contact with, and it should be essentially odorless and non-toxic.

Although not restricted to any particular viscosity range or printhead, the inventive ink set is particularly suited to lower viscosity applications such as those required by thermal printheads. Thus the viscosity of the inventive inks at 25° C. can be less than about 7 cPs, typically less than about 5 cPs, and more typically than about 3.5 cPs. Thermal inkjet actuators rely on instantaneous heating/bubble formation to eject ink drops and this mechanism of drop formation generally requires inks of lower viscosity.

Substrate

The instant invention is particularly advantageous for printing on plain paper, such as common electrophotographic copier paper and photo paper, glossy paper and similar papers used in inkjet printers The following examples illustrate the invention without, however, being limited thereto.

EXAMPLES

The inks in the following examples were prepared by adding the indicated formulation ingredients to the dispersion(s)

followed by mixing and filtering through a 2.5 micron filter to remove any oversize material. De-ionized water was used unless otherwise stated. The amounts of ingredient are in weight percent based the total weight of ink.

Polymer 1

Polymer 1 was a block copolymer with methacrylic acid// benzyl methacrylate//ethyltriethyleneglycol methacrylate (13//15//4) prepared in a manner similar to "Preparation 4" described in U.S. Pat. No. 5,519,085, with the modifications that the level of monomers was adjusted to give the composition ratio as indicated. The neutralizing agent employed was lithium hydroxide to provide the polymer in a lithium salt form. Polymer 1 thus prepared has a number average molecular weight of about 5,000 and a weight average molecular weight of about 6,000 g/mol.

Dispersion 1

Carbon black (Nipex 1801Q, supplied by Degussa Evonik having a surface area of 260 m$^2$/g) was treated with ozone according to the procedure described in WO0194476 until the desired level of surface functionalization was achieved. During this procedure, the dispersion was neutralized with potassium hydroxide. The final concentration of pigment was 16.2%. The measured concentration of potassium counter ion in the dispersion after an ultra filtration was 2,614 ppm, which indicated a degree of surface functionalization of 0.41 mmole/g of pigment or 1.6 μmol/m$^2$ of pigment surface.

Dispersion 2

Dispersion 2 was similar to Dispersion 1 except that the starting pigment was S160 from Degussa (with a surface area of 150 m$^2$/g) and lithium hydroxide was used as the neutralizing agent to provide a SDP in a lithium salt form with a median particle size of about 110 nm.

Dispersion 3

Dispersion 3 was a carbon black pigment stabilized with Polymer 1 as the dispersant. It was prepared in a manner similar to Example 3 described in U.S. Pat. No. 5,519,085. The pigment concentration was adjusted to about 15% by weight.

Dispersion 4

Dispersion 4 was Cabojet® 300 (a self-dispersing carbon black pigment from Cabot Corporation) dispersed in water at a concentration of about 15% by weight. This is a graft-type SDP with carboxyl groups grafted to the pigment surface through a spacer group. The cationic counter ion was sodium.

Evaluation of Optical Density

Optical density (OD) measurements were taken from images printed by an inkjet printer such as a Canon i560 printer. The images consisted of a test pattern printed on plain papers, such as Hammermill Copy Plus, Hewlett Packard Office paper and Xerox 4024 paper. The coverage that an inkjet printer puts down on a substrate is usually controlled by the printer software and can be set in the printer settings. Printing was done in the selected standard print mode that targets 100% coverage. This setting for 100% coverage means that the inkjet printer is to fire enough droplets/dots to cover at least 100% of the area being printed. This usually results in dots spreading and partially overlapping with each other. The reported optical density (OD) values for areas printed at 100% coverage were measured with a Greytag Macbeth Spectrolino spectrometer manufactured by Greytag-Macbeth AG, Regensdorf, Switzerland.

Determination of "Decap" Time

The "decap" time, or latency period, was determined according to the following procedure using a Hewlett Packard 850 printer that was altered so that the ink cartridge would not be serviced during the test. Just prior to the beginning of the test, the nozzles were primed, and a nozzle check pattern was performed to ensure all nozzles fired properly. No further servicing was then conducted during the test.

During each scan across the page, the pen prints a test pattern of 149 vertical lines spaced at about 1/16 inch apart. Each vertical line is formed by the firing of one drop by all nozzles, thus the line is one drop wide and about ½ inch high corresponding to the length of the nozzle array on the printhead. The first vertical line in a scan corresponds to the first drop fired from each nozzle, the fifth line corresponds to the fifth drop from each nozzle during the same scan, and so forth for all 149 vertical lines.

The printing of the same test pattern was repeated at increasingly longer time intervals (decap times) between scans. The standard time intervals between scans were 1, 2, 3, 4, 5, 6, 7, 8, 9, 10, 20, 30, 40, 50, 60, 70, 80, 90 100, 200, 300, 400, 500, 600, 700, 800, 900, and 1000 seconds. Time intervals beyond 1000 seconds were not attempted.

Upon completion of the test, the $1^{st}$, $5^{th}$, and $32^{nd}$ vertical lines in each scan were examined for consistency, misdirected drop deposits, and clarity of the print. These lines correspond to the $1^{st}$, $5^{th}$ and $32^{nd}$ drops of ink droplets ejected from the nozzle after a prescribed latency period. The decap time was the longest time interval where the particular vertical line can be printed without significant defects. Typically, the pen will fire properly on the first drop. When the first drop fails to eject properly, the decap times for the fifth and thirty-second drops are relied upon to determine the severity of clog formation and how easily the nozzles can be recovered.

The results tables hereinafter report only the first drop decap time and refer to the value simply as the "Decap Time" in units of seconds.

Determination of Degree of Functionalization (Acid Value)

The acid value of the SDP in these examples was determined by the equivalent moles of base (in this case KOH) required to neutralize the treated pigment to a pH of 7. Since the surface hydrophilic groups are substantially all acidic, the acid value also equals the degree of functionalization.

The neutralized mixture was purified by an ultra-filtration to remove free acids, salts, and contaminants. The purification process was performed to repeatedly wash pigment with de-ionized water until the conductivity of the mixture leveled off and remained relatively constant. Normally a large quantity of de-ionized water ranging from three- to ten-fold of the mixture volume was needed to achieve pigment purification.

After a pigment was purified, the equivalent moles of potassium ions remaining on pigment was determined by atomic absorption (AA) analysis using a Perkin Elmer (Model AA Analyst 300) Atomic Absorption Spectrometer configured with an AS-90 autosampler, AS-90/AS-91 controller, and Lumina lamps for potassium. The content was typically indicated as milligrams of metal counter ion per kilogram of SDP, or ppm based on weight. Inductive Coupled Plasma (ICP) analysis was used to independently verify the counterion content; the values for ICP and AA were comparable. The following equations convert ppm into mmoles/g of pigment and μmoles/M$^2$ of pigment surface:

mmoles/g=(ppm/AW)/(1000 g/Kg×pigment %/100), wherein AW is atomic weight of the metal;

μmoles/m2=mmoles/g×(1 g/SA)×1000 (μmole/ mmole), wherein SA is the pigment surface area in m$^2$ per gram.

Example 1

Inks 1A-1D were prepared using Dispersion 1 and other ingredients according to Table 1. Similarly Inks 1E and 1F were prepared using Dispersion 2 and other ingredients according to Table 2. The silver salts were added as 1% aqueous solution. Inks 1A-1F were loaded into and printed from a Canon i560 printer. Substrates were Xerox 4200 paper, Hewlett Packard Multipurpose paper ("HP Multipurpose") and Hewlett Packard Office paper ("HP Office").

TABLE 1

|  | Ink 1A (Comparative) | Ink 1B | Ink 1C | Ink 1D |
|---|---|---|---|---|
| Ingredients | | | | |
| Dispersion 1* | 3.5 | 3.5 | 3.5 | 3.5 |
| Silver acetate* | — | 0.01 | 0.02 | 0.05 |
| Diethylene glycol* | 10 | 10 | 10 | 10 |
| 2-pyrrolidone* | 10 | 10 | 10 | 10 |
| Surfynol ® 465* | 0.2 | 0.2 | 0.2 | 0.2 |
| DI Water | Balance to 100% | Balance to 100% | Balance to 100% | Balance to 100% |
| Physical Properties | | | | |
| Conductivity | 0.18 | 0.31 | 0.26 | 0.34 |
| pH | 6.46 | 6.27 | 5.88 | 5.97 |
| Surface tension (mN · m$^{-1}$) | 41.8 | 42.8 | 42.4 | 42.2 |
| Viscosity (cPs) | 2.2 | 2.1 | 2.1 | 2.1 |

*as % by weight based on total weight of ink

TABLE 2

|  | Ink 1E (Comparative) | Ink 1F |
|---|---|---|
| Ingredients | | |
| Dispersion 2* | 3.5% | 3.55% |
| Silver acetate* | — | 0.05% |
| Diethylene glycol* | 10% | 10% |
| 2-pyrrolidone* | 10% | 10% |
| Surfynol ® 465* | 0.2% | 0.2% |
| DI Water | Balance to 100% | Balance to 100% |
| Physical Properties | | |
| Conductivity | 0.15 | 0.25 |
| pH | 6.88 | 6.00 |
| Surface tension (mN · m$^{-1}$) | 39.9 | 40.2 |
| Viscosity (cPs) | 2.4 | 2.4 |

*as % by weight based on total weight of ink

Print properties of inks on the various papers are summarized in Tables 1A and 2A below. Addition of silver acetate increased the OD of black pigment inks made with both potassium-neutralized (Inks 1B, 1C and 1D) and lithium-neutralized (Ink 1F) SDP. With potassium-neutralized SDP in Inks 1B, 1C and 1D, the decap times were also increased. With lithium-neutralized SDP in Ink 1F, no improvement in decap time was observed. The maximum concentration for silver acetate in Example 1 is 0.05% by weight which corresponds to 86 micromoles of silver per gram of pigment, whereas the concentration of potassium is about 400 micromoles per gram of pigment.

TABLE 1A

| Print Properties | Ink 1A (Comparative) | Ink 1B | Ink 1C | Ink 1D |
|---|---|---|---|---|
| OD Hammermill Copy Plus | 1.34 | 1.38 | 1.40 | 1.43 |
| OD HP Office | 1.35 | 1.42 | 1.47 | 1.46 |
| OD Xerox 4024 | 1.35 | 1.38 | 1.41 | 1.43 |
| Average OD | 1.35 | 1.39 | 1.43 | 1.44 |
| Decap Time (seconds) | 100 | 600 | 400 | >1,000 |

TABLE 2A

| Print Properties | Ink 1E (Comparative) | Ink 1F |
|---|---|---|
| OD Hammermill Copy Plus | 1.38 | 1.42 |
| OD HP Office | 1.38 | 1.42 |
| OD Xerox 4024 | 1.41 | 1.46 |
| Average OD | 1.39 | 1.43 |
| Decap Time (seconds) | 8 | 6 |

Example 2

Inks 2A-2C were prepared using Dispersion 1 and other ingredients according to Table 3 below. Different amounts of diethylene glycol and 2-pyrrolidone were employed.

TABLE 3

|  | Ink 2A | Ink 2B | Ink 2C |
|---|---|---|---|
| Ingredients | | | |
| Dispersion 1* | 3.5 | 3.55 | 3.5 |
| Silver acetate* | 0.05 | 0.05 | 0.05 |
| Diethylene glycol* | 20 | 15 | — |
| 2-pyrrolidone* | — | 5 | 20 |
| Surfynol ® 465* | 0.2 | 0.2 | 0.2 |
| DI Water | Balance to 100% | Balance to 100% | Balance to 100% |
| Physical Properties | | | |
| Conductivity | 0.32 | 0.33 | 0.35 |
| pH | 5.89 | 5.94 | 6.13 |
| Surface tension (mN · m$^{-1}$) | 41.9 | 41.4 | 43.2 |
| Viscosity (cPs) | 2.2 | 2.2 | 2.1 |

*as % by weight based on total weight of ink

As shown in Table 3A below, each ink was found to have similar increased OD not particularly affected by the changes in vehicle composition.

TABLE 3A

| Print Properties | Ink 2A | Ink 2B | Ink 2C |
|---|---|---|---|
| OD Hammermill Copy Plus | 1.44 | 1.46 | 1.44 |
| OD HP Office | 1.51 | 1.46 | 1.41 |
| OD Xerox 4024 | 1.44 | 1.44 | 1.41 |
| Average OD | 1.46 | 1.45 | 1.42 |
| Decap Time (seconds) | 800 | 700 | 300 |

Example 3

Inks 3A-3F were prepared according to the listings of ingredients in Table 4 below. A different silver salt was employed in each ink.

TABLE 4

| | Ink 3A | Ink 3B | Ink 3C | Ink 3D | Ink 3E | Ink 3F |
|---|---|---|---|---|---|---|
| Ingredients | | | | | | |
| Dispersion 1* | 3.5 | 3.55 | 3.5 | 3.5 | 3.5 | 3.5 |
| Silver benzoate* | 0.05 | — | — | — | — | — |
| Silver carbonate* | | 0.05 | | | | |
| Silver chloride* | | | 0.05 | | | |
| Silver nitrate* | | | | 0.05 | | |
| Silver phosphate* | | | | | 0.05 | |
| Silver sulfate* | | | | | | 0.05 |
| Diethylene glycol* | 10 | 10 | 10 | 10 | 10 | 10 |
| 2-pyrrolidone* | 10 | 10 | 10 | 10 | 10 | 10 |
| Surfynol ® 465* | 0.2 | 0.2 | 0.2 | 0.2 | 0.2 | 0.2 |
| DI Water | Balance to 100 % | Balance to 100 % | Balance to 100 % | Balance to 100 % | Balance to 100 % | Balance to 100 % |
| Physical Properties | | | | | | |
| Conductivity | 0.20 | 0.21 | 0.17 | 0.40 | 0.19 | 0.40 |
| pH | 6.76 | 7.35 | 6.73 | 5.71 | 6.81 | 5.89 |
| Surface tension (mN.m$^{-1}$) | 40.5 | 42.2 | 41.8 | 41.8 | 42.2 | 42.7 |
| Viscosity (cPs) | 2.2 | 2.2 | 2.2 | 2.2 | 2.2 | 2.1 |

*as % by weight based on total weight of ink

As shown in Table 4A below, the presence of silver salts, particularly silver phosphate and silver sulfate, was found to provide significantly improved OD.

TABLE 4A

| Print Properties | Ink 3A | Ink 3B | Ink 3C | Ink 3D | Ink 3E | Ink 3F |
|---|---|---|---|---|---|---|
| OD Hammermill Copy Plus | 1.37 | 1.39 | 1.37 | 1.35 | 1.43 | 1.45 |
| OD HP Office | 1.38 | 1.35 | 1.38 | 1.35 | 1.45 | 1.45 |
| OD Xerox 4024 | 1.40 | 1.41 | 1.38 | 1.34 | 1.42 | 1.44 |
| Average OD | 1.38 | 1.38 | 1.38 | 1.34 | 1.43 | 1.45 |
| Decap Time (seconds) | 100 | 100 | 100 | 300 | 100 | 700 |

Additional inks similar to the ones in Table 4 were prepared according to the listings of ingredients in Table 5. These inks were allowed to age overnight before being filtered and tested. As shown in Table 5A, aging the inks increased the decap times, but had no impact on OD.

TABLE 5

| | Ink 3G | Ink 3H | Ink 3I |
|---|---|---|---|
| Ingredients | | | |
| Dispersion 1 | 3.5 | 3.5 | 3.5 |
| Silver Acetate | 0.05 | — | — |
| Silver nitrate | | 0.05 | |
| Silver phosphate | | | 0.05 |
| Diethylene glycol | 10 | 10 | 10 |
| 2-pyrrolidone | 10 | 10 | 10 |
| Surfynol ® 465 | 0.2 | 0.2 | 0.2 |
| DI Water | Balance to 100% | Balance to 100% | Balance to 100% |
| Physical Properties | | | |
| Conductivity | 0.39 | 0.46 | 0.26 |
| pH | 5.44 | 5.29 | 5.99 |
| Surface tension (mN · m$^{-1}$) | 43.6 | 44.0 | 44.0 |
| Viscosity (cPs) | 2.2 | 2.1 | 2.2 |

*as % by weight based on total weight of ink

TABLE 5A

| Print Properties | Ink 3G | Ink 3H | Ink 3I |
|---|---|---|---|
| OD Hammermill Copy Plus | 1.36 | 1.27 | 1.25 |
| OD HP Office | 1.31 | 1.27 | 1.17 |
| OD Xerox 4024 | 1.43 | 1.22 | 1.32 |
| Average OD | 1.37 | 1.25 | 1.25 |
| Decap Time (seconds) | 800 | 700 | >1,000 |

Example 4

Inks 4A-4D were prepared according to the listings of ingredients in Table 6 below.

TABLE 6

| | Ink 4A | Ink 4B | Ink 4C | Ink 4D |
|---|---|---|---|---|
| Ingredients | | | | |
| Dispersion 3* | 3.5 | 3.5 | — | — |
| Dispersion 4* | — | — | 3.5 | 3.5 |
| Silver acetate* | — | 0.05 | — | 0.05 |
| Diethylene glycol* | 10 | 10 | 10 | 10 |
| 2-pyrrolidone* | 10 | 10 | 10 | 10 |
| Surfynol ® 465* | 0.2 | 0.2 | 0.2 | 0.2 |
| DI Water | Balance to 100% | Balance to 100% | Balance to 100% | Balance to 100% |
| Physical Properties | | | | |
| Conductivity | 1.01 | 1.00 | 0.22 | 0.43 |
| pH | 7.73 | 7.82 | 7.66 | 8.41 |
| Surface tension (mN · m$^{-1}$) | 43.4 | 44.0 | 44.2 | 39.8 |
| Viscosity (cPs) | 2.4 | 2.6 | 2.1 | 2.2 |

*as % by weight based on total weight of ink

As shown in Table 6A, modest increases in OD were observed in Inks 4B and 4D. No decap data was obtained for these two inks

TABLE 6A

| Print Properties | Ink 4A | Ink 4B | Ink 4C | Ink 4D |
|---|---|---|---|---|
| OD Hammermill Copy Plus | 0.99 | 1.01 | 1.14 | 1.17 |

TABLE 6A-continued

| Print Properties | Ink 4A | Ink 4B | Ink 4C | Ink 4D |
|---|---|---|---|---|
| OD HP Office | 0.90 | 0.91 | 1.05 | 1.07 |
| OD Xerox 4024 | 0.91 | 0.95 | 1.15 | 1.15 |
| Average OD | 0.93 | 0.96 | 1.11 | 1.13 |

Example 5

Inks 5A-5C were prepared according to the listings of ingredients in Table 7 below. These inks incorporated an acrylic binder (Polymer 1).

TABLE 7

| | Ink 5A | Ink 5B | Ink 5C |
|---|---|---|---|
| Ingredients | | | |
| Dispersion 1* | 3.5 | — | — |
| Dispersion 2* | — | 3.5 | 3.5 |
| Polymer 1* | 1.0 | 1.0 | 1.0 |
| Silver acetate* | 0.05 | — | 0.05 |
| Diethylene glycol* | 10 | 10 | 10 |
| 2-pyrrolidone* | 10 | 10 | 10 |
| Surfynol ® 465* | 0.2 | 0.2 | 0.2 |
| DI Water | Balance to 100% | Balance to 100% | Balance to 100% |
| Physical Properties | | | |
| Conductivity | 0.85 | 0.69 | 0.81 |
| pH | 7.79 | 7.77 | 7.64 |
| Surface tension (mN · m$^{-1}$) | 41.8 | 41.0 | 40.5 |
| Viscosity (cPs) | 2.7 | 2.7 | 2.7 |

*as % by weight based on total weight of ink

As shown in Table 7A below, the presence of Polymer 1 binder in Ink 5B was found to lower the OD of the ink when compared to the comparative Ink 1E. The presence of silver salt and Polymer 1 binder in Ink 5C further lowered the OD of the ink when compared to Ink 5B. The presence of both Polymer 1 binder and silver salt in Ink 5A made with the potassium-SDP (Dispersion 1) provided an ink with low OD.

TABLE 7A

| Print Properties | Ink 5A | Ink 5B | Ink 5C |
|---|---|---|---|
| OD Hammermill Copy Plus | 1.07 | 1.37 | 1.32 |
| OD HP Office | 1.10 | 1.43 | 1.31 |
| OD Xerox 4024 | 1.09 | 1.40 | 1.38 |
| Average OD | 1.09 | 1.40 | 1.34 |

Example 6

During the preparation of Inks 6A and 6B with 0.25% of silver acetate and other ingredients listed in Table 8 below, flocculation of pigment apparently caused by the silver salt was observed. Inks prepared with 0.1% of silver acetate were found to be stable, but the print quality was poor due to misdirected drops.

TABLE 8

| Ingredients | Ink 6A (Comparative) | Ink 6B (Comparative) |
|---|---|---|
| Dispersion 1* | 3.5 | — |
| Dispersion 2* | — | 3.5 |

TABLE 8-continued

| Ingredients | Ink 6A (Comparative) | Ink 6B (Comparative) |
|---|---|---|
| Silver acetate* | 0.25 | 0.25 |
| Diethylene glycol* | 10 | 10 |
| 2-pyrrolidone* | 10 | 10 |
| Surfynol ® 465* | 0.2 | 0.2 |
| DI Water | Balance to 100% | Balance to 100% |

*as % by weight based on total weight of ink

Example 7

The control ink below in Table 9 was made using Dispersion 1 and the vehicle in Example 1 without the addition of any silver salt. The inventive ink and three comparative inks were made by adding 0.05% of silver acetate, calcium nitrate, magnesium nitrate and zinc acetate respectively. The inks were kept in an oven at 70° C. for a week before the dispersion particle sizes were measured to evaluate ink stability. As shown below, the inventive ink made with silver acetate was found to be stable unlike inks made with divalent metal salts.

TABLE 9

| Ink | Additive | Plain Paper OD | Decap time (seconds) | Particle size change (1 week at 70° C.) |
|---|---|---|---|---|
| Control | None | 1.34 | 90 | −2% |
| Inventive ink | Silver acetate* (0.05%) | 1.45 | >1,000 | 0% |
| Ink 1 (Comparative) | Calcium nitrate* (0.05%) | 1.36 | 500 | +20% |
| Ink 2 (Comparative) | Magnesium nitrate* (0.05%) | 1.35 | 400 | +120% |
| Ink 3 (Comparative) | Zinc acetate* (0.05%) | 1.38 | 600 | +120% |

*as % by weight based on total weight of ink

What is claimed is:

1. An aqueous inkjet ink comprising an aqueous vehicle, a pigment colorant and a water-soluble silver salt, wherein said colorant is a self-dispersing pigment having at least one type of a hydrophilic functional group bonded onto the surface of the self-dispersing pigment, and said hydrophilic functional group comprising a carboxyl group.

2. The aqueous inkjet ink of claim 1, wherein the silver salt is present at a concentration in the range of from 0.01% to 0.25% by weight.

3. The aqueous inkjet ink of claim 2, wherein the silver salt is present at a concentration of about 0.01% by weight.

4. The aqueous inkjet ink of claim 2, wherein the silver salt is present at a concentration of about 0.05% by weight.

5. The aqueous inkjet ink of claim 2, wherein the silver salt is present at a concentration of about 0.25% by weight.

6. The aqueous inkjet ink of claim 2, wherein the silver salt is selected from the group consisting of silver acetate, silver phosphate, silver sulfate, silver nitrate, and combinations thereof.

7. The aqueous inkjet ink of claim 6, wherein the silver salt is silver acetate.

8. The aqueous inkjet ink of claim 6, wherein the silver salt is silver phosphate.

9. The aqueous inkjet ink of claim 6, wherein the silver salt is silver sulfate.

10. The aqueous inkjet ink of claim 1, wherein said self-dispersing pigment has a degree of functionalization of less than about 3 $\mu mol/m^2$.

11. The aqueous inkjet ink of claim 10, wherein the silver salt is present at a concentration in the range of from 0.01% to 0.25% by weight.

12. The aqueous inkjet ink of claim 10 or 11, wherein the silver salt is present at a concentration of about 0.01% by weight.

13. The aqueous inkjet ink of claim 10 or 11, wherein the silver salt is present at a concentration of about 0.05% by weight.

14. The aqueous inkjet ink of claim 10 or 11, wherein the silver salt is present at a concentration of about 0.25% by weight.

15. The aqueous inkjet ink of claim 11, wherein the silver salt is selected from the group consisting of silver acetate, silver phosphate, silver sulfate, silver nitrate, and combinations thereof.

16. The aqueous inkjet ink of claim 15, wherein the silver salt is silver acetate.

17. The aqueous inkjet ink of claim 15, wherein the silver salt is silver phosphate.

18. The aqueous inkjet ink of claim 15, wherein the silver salt is silver sulfate.

* * * * *